US012424230B2

(12) United States Patent
Cui et al.

(10) Patent No.: US 12,424,230 B2
(45) Date of Patent: Sep. 23, 2025

(54) DECODING METHOD AND APPARATUS, AND COMPUTER READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Wuyang Cui, Beijing (CN); Junyi Wu, Beijing (CN); Yuyu Cai, Beijing (CN); Gang Quan, Beijing (CN); Fan Yang, Beijing (CN); Guohong Ding, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 62 days.

(21) Appl. No.: 18/546,387

(22) PCT Filed: Jan. 4, 2022

(86) PCT No.: PCT/CN2022/070088
§ 371 (c)(1),
(2) Date: Aug. 14, 2023

(87) PCT Pub. No.: WO2022/183841
PCT Pub. Date: Sep. 9, 2022

(65) Prior Publication Data

US 2024/0135942 A1 Apr. 25, 2024
US 2024/0233740 A9 Jul. 11, 2024

(30) Foreign Application Priority Data

Mar. 2, 2021 (CN) ........................ 202110229441.9

(51) Int. Cl.
*G10L 19/16* (2013.01)

(52) U.S. Cl.
CPC .................................. *G10L 19/167* (2013.01)

(58) Field of Classification Search
CPC ....... G10L 19/167; G10L 15/04; G10L 15/22; G10L 2015/225
See application file for complete search history.

(56) References Cited

U.S. PATENT DOCUMENTS

2004/0218893 A1 11/2004 Karimoto et al.
2005/0018775 A1* 1/2005 Subramanian ... H04N 21/43072 375/E7.278

(Continued)

FOREIGN PATENT DOCUMENTS

CN 1545805 A 11/2004
CN 1835591 A 9/2006

(Continued)

OTHER PUBLICATIONS

"International Search Report and Written Opinion of the International Searching Authority with English language translation", International Application No. PCT/CN2022/070088, Mar. 29, 2022, 17 pp.

(Continued)

*Primary Examiner* — Anne L Thomas-Homescu
(74) *Attorney, Agent, or Firm* — Myers Bigel, P.A.

(57) ABSTRACT

The present disclosure relates to a decoding method, apparatus and computer-readable storage medium, which relates to the field of computer technology. The method of the present disclosure includes buffering one or more stream segments of a data stream which are received, wherein the data stream comprises an audio stream; parsing the one or more stream segments buffered until header information is obtained through the parsing; storing the header informa- (Continued)

tion; and decoding stream segments of the audio stream among various stream segments received according to the header information until the audio stream is completely decoded.

20 Claims, 4 Drawing Sheets

(56) References Cited

U.S. PATENT DOCUMENTS

| | | | |
|---|---|---|---|
| 2006/0212710 | A1 | 9/2006 | Baum et al. |
| 2017/0318323 | A1 | 11/2017 | Wang et al. |

FOREIGN PATENT DOCUMENTS

| | | | | | |
|---|---|---|---|---|---|
| CN | 1909657 | A | | 2/2007 | |
| CN | 102254560 | A | | 11/2011 | |
| CN | 104113777 | A | | 10/2014 | |
| CN | 104202656 | A | | 12/2014 | |
| CN | 104780422 | A | | 7/2015 | |
| CN | 108122558 | A | | 6/2018 | |
| CN | 108389582 | A | * | 8/2018 | ........... G10L 19/005 |
| CN | 110650308 | A | * | 1/2020 | ............. H04N 19/42 |
| CN | 111147942 | A | | 5/2020 | |
| IN | 201617011930 | A | | 8/2016 | |
| JP | 2004252109 | A | | 9/2004 | |
| KR | 100706968 | B1 | | 4/2007 | |
| KR | 100746050 | B1 | | 7/2007 | |
| WO | 2015055683 | A1 | | 4/2015 | |

OTHER PUBLICATIONS

"First Office Action and English language Translation", CN Application No. 202110229441.9, Mar. 5, 2025, 16 pp.

* cited by examiner

DECODING METHOD AND APPARATUS, AND COMPUTER READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2022/070088, filed on Jan. 4, 2022, which is based on and claims priority of Chinese application for invention No. 202110229441.9, filed on Mar. 2, 2021, the disclosures of both of which are hereby incorporated into this disclosure by reference in its entirety.

TECHNICAL FIELD

The present disclosure relates to the technical field of computers, and in particular, to a decoding method, apparatus, and computer-readable storage medium.

BACKGROUND

With the rapid development of artificial intelligence (AI), AI customer service robots have gained increasingly widespread applications. The AI customer service robots involve speech recognition technology that relies on an input of a real-time audio stream as a prerequisite. Generally, in the field of AI customer service, it is necessary to identify words spoken by a user with a robot, and then transmit the words into the system as an audio stream in real time. Therefore, real-time decoding of the audio stream has become a problem to be solved.

The real-time decoding of the audio stream needs to acquire a format and parameters of the audio stream, which are typically comprised in header information of the audio stream.

SUMMARY

According to some embodiments of the present disclosure, there is provided a decoding method, comprising: buffering one or more stream segments of a data stream which are received, wherein the data stream comprises an audio stream; parsing the one or more stream segments buffered until header information is obtained through the parsing; storing the header information; and decoding stream segments of the audio stream among various stream segments received according to the header information until the audio stream is completely decoded.

In some embodiments, the parsing the one or more stream segments buffered until header information is obtained through the parsing comprises: determining whether a total data length of all stream segments currently buffered reaches a preset frame length; parsing data of the preset frame length from a starting position in the stream segments currently buffered, in a case where the total data length of all the stream segments currently buffered reaches the preset frame length; determining whether the header information is successfully parsed; updating the preset frame length by increasing the preset frame length by a preset value, in a case where the header information is not successfully parsed; and repeating the above until the header information is parsed.

In some embodiments, the parsing the one or more stream segments buffered until header information is obtained through the parsing further comprises: in a case where the total data length of all the stream segments currently buffered does not reach the preset frame length, after receiving and buffering a next stream segment, re-determining whether the total data length of all the stream segments currently buffered reaches the preset frame length.

In some embodiments, the decoding stream segments of the audio stream among various stream segments received according to the header information comprises: determining a length of an audio frame according to the header information; and decoding the stream segments of the audio stream among the various stream segments received by distinguishing different audio frames according to the length of the audio frame.

In some embodiments, the decoding the stream segments of the audio stream among various stream segments received by distinguishing different audio frames according to the length of the audio frame comprises: dividing a current stream segment of the audio stream according to a sequence defined by a data encapsulation format and according to the audio frame length to obtain one or more complete audio frames; decoding the one or more complete audio frames; determining whether data at an end of the current stream segment of the audio stream belongs to an incomplete audio frame; in a case where the data at the end of the current stream segment of the audio stream belongs to the incomplete audio frame, buffering the incomplete audio frame; after receiving a next stream segment of the current stream segment of the audio frame, splicing the next stream segment with the incomplete audio frame to obtain a spliced stream segment; taking the spliced stream segment as the current stream segment of the audio stream; and repeating the above until a last stream segment of the audio stream is completely decoded.

In some embodiments, the decoding stream segments of the audio stream among various stream segments received according to the header information until the audio stream is completely decoded comprises: parsing a current stream segment or parsing the current stream segment and stream segments following the current stream segment in a case where a failure is occurred in the decoding of the current stream segment of the audio stream based on the header information, until new header information is obtained through the parsing; and decoding the stream segments following the current stream segment according to the new header information until the audio stream is completely decoded.

In some embodiments, the parsing the one or more stream segments buffered until header information is obtained through the parsing comprises: parsing the one or more stream segments buffered by calling an Open avformat method in FFmpeg until the header information is obtained through the parsing.

In some embodiments, the decoding stream segments of the audio stream among various stream segments received according to the header information comprises: determining whether the data stream comprises a data stream other than the audio stream according to the header information; in a case where the data stream comprises the data stream other than the audio stream, separating the data stream other than the audio stream from the audio stream; determining format information of the audio stream according to the header information; transcoding the stream segments of the audio stream into an original audio stream according to the format information of the audio stream; and re-sampling the original audio stream at a preset bit rate.

In some embodiments, the data stream other than the audio stream is separated from the audio stream by calling a Separate stream method in FFmpeg; the format information of the audio stream is determined according to the header information, the stream segments of the audio stream are transcoded into the original audio stream according to the format information of the audio stream, and the original audio stream is re-sampled at the preset bit rate, by calling a Parse format method in FFmpeg.

According to still other embodiments of the present disclosure, there is provided a decoding apparatus, comprising: a processor; a memory coupled to the processor for storing instructions that, when executed by the processor, cause the processor to execute the decoding method of any one of the foregoing embodiments.

According to still other embodiments of the present disclosure, there is provided a non-transitory computer-readable storage medium on which a computer program is stored, wherein the program, when executed by a processor, implements the decoding method of any one of the foregoing embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that in an actual scenario of an AI customer service, an audio needs to be streamed, that is, a file of the audio file is divided into stream segments for transmission. In this case, a first stream segment or the first few stream segments comprise header information generated during audio coding. Subsequent stream segments do not contain any header information. Especially when the FFmpeg tool is used to decode different stream segments, error information may be returned because most stream segments do not contain the header information and cannot be decoded, which cannot meet a real-time decoding requirement of the stream segments in the actual scenario of the AI customer service.

A technical problem to be solved by the present disclosure is how to achieve real-time decoding of an audio stream.

The present disclosure provides a decoding method that can be used for real-time decoding of an audio stream in the AI customer service scenario, which will be described below with reference to FIGS. 1 to 3.

Figure 1:
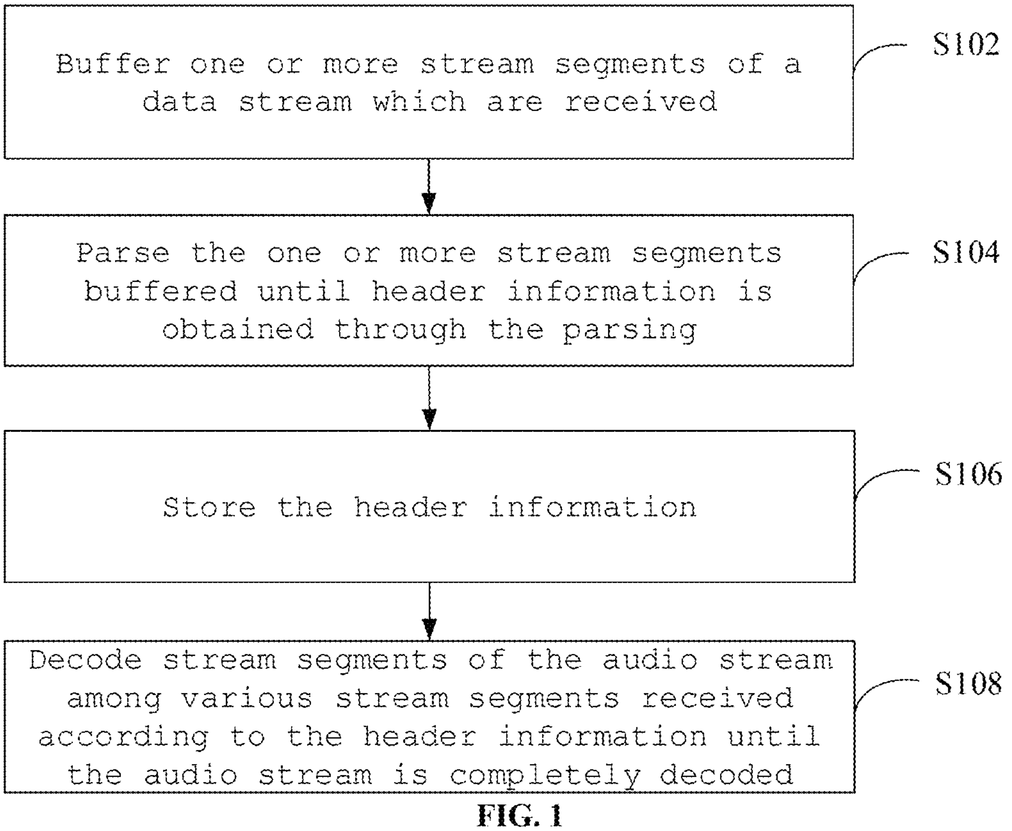
FIG. 1 shows a flowchart of a decoding method according to some embodiments of the present disclosure.

FIG. 1 is a flowchart of a decoding method according to some embodiments of the present disclosure. As shown in FIG. 1, the method of these embodiments comprises: steps S102 to S108.

In step S102, one or more stream segments of a data stream which are received are buffered.

The data stream comprises an audio stream and may further comprise a data stream other than the audio stream. For example, a non-audio data stream such as a video stream. In a case where the audio stream is mixed with the data stream other than the audio stream, it is necessary to separate different streams in subsequent steps, which will be described in the following embodiments. During transmission, the data stream is divided into multiple stream segments, and each of the stream segments can be packaged into a data package for transmission. After receiving the data packet, a decoding apparatus (an apparatus executing the decoding method of the present disclosure) parses the data packet to obtain and buffer the each of the stream segments.

The scheme of the present disclosure can be implemented based on FFmpeg APIs. First, two modules (Init avformat/Init avio context) can be initialized for parsing header information and reading the audio stream respectively. A Buffer stream method can be called to buffer the one or more streaming segments.

In step S104, the one or more stream segments buffered are parsed until header information is obtained through the parsing.

The header information comprises, for example, format information of the audio stream and at least one parameter. For example, the at least one parameter comprises, but not limited to, at least one of a sampling rate, a bit depth, a number of channels, and a compression ratio. Due to an uncertain division of the stream segments, one stream segment may contain complete header information, or only partial header information, and multiple stream segments may be required to obtain the complete header information. In some embodiments, once a stream segment is buffered, an attempt is made to parse all stream segments buffered to determine whether the header information can be successfully parsed. If the header information cannot be successfully parsed, a next stream segment is buffered continuously, and the above process is repeated until the header information can be successfully parsed.

In some embodiments, whether a total data length of all stream segments currently buffered reaches a preset frame length is determined; in a case where the total data length of all the stream segments currently buffered reaches the preset frame length, data of the preset frame length from a starting position in the stream segments currently buffered is parsed; whether the header information is successfully parsed is determined; in a case where the header information is not successfully parsed, the preset frame length by increasing the preset frame length by a preset value is updated; and the above is repeated until the header information is parsed.

The preset frame length can be obtained through statistics for length of header information of historical audio streams. Once a stream segment is buffered, it is determined whether the total data length of all stream segments currently buffered reaches the preset frame length. In a case where the total data length of all the stream segments currently buffered does not reach the preset frame length, after receiving and buffering a next stream segment, whether the total data length of all the stream segments currently buffered reaches the preset frame length is re-determined. Until the total data length of all the stream segments currently buffered reaches the preset frame length, the data of the preset frame length from the starting position in the stream segments currently buffered is parsed.

For example, if the preset frame length is 200 bytes, data having a length of 200 bytes from a first byte of a first buffered stream segment is used as data to be parsed. The data to be parsed is parsed to determine whether the header information can be successfully parsed. If the header information can be successfully parsed, the parsing process of the header information is stopped. If the parsing of the header information fails, the preset frame length is increased by a preset value to update the preset frame length. For example, it can be increased from 200 bytes to 300 bytes. Thereafter, the process is re-performed from the step of determining whether the total data length of all stream segments currently buffered reaches the preset frame length.

The one or more stream segments buffered can be parsed by calling an Open avformat method in FFmpeg until the header information is obtained through the parsing. Through continuously attempting to parse the head information of the stream segments buffered, the above method can avoid the problem of failing to successfully parse the header information in a case where the header information is divided into different stream segments. By judging and updating the preset frame length, the number of parsing can be reduced and efficiency can be improved.

In step S106, the header information is stored.

In step S108, stream segments of the audio stream among various stream segments received according to the header information is decoded until the audio stream is completely decoded.

If the data stream only contains the audio stream, the header information is used to directly decode each stream segment received. If the data stream comprises the audio stream and a data stream other than the audio stream (non-audio data streams), it is necessary to perform an operation to separate streams. In some embodiments, whether the data stream comprises a data stream other than the audio stream according to the header information is determined; in a case where the data stream comprises the data stream other than the audio stream, the data stream other than the audio stream is separated from the audio stream. For example, the data stream other than the audio stream is separated from the audio stream by calling a Separate stream method in FFmpeg.

After separating the stream segments of the audio stream from various stream segments received, the stream segments of the audio stream are decoded using the header information. In some embodiments, format information of the audio stream according to the header information is determined; the stream segments of the audio stream into an original audio stream are transcoded according to the format information of the audio stream; and the original audio stream is re-sampled at a preset bit rate. A re-sampled bit rate is suitable for a bit rate of a playback apparatus to facilitate playback of the audio stream. For example, the format information of the audio stream is determined according to the header information, the stream segments of the audio stream are transcoded into the original audio stream according to the format information of the audio stream, and the original audio stream is re-sampled at the preset bit rate, by calling a Parse format method in Ffmpeg.

If the audio stream only contains a complete audio file, correct decoding of the entire audio stream can be achieved using the header information stored. If an audio stream contains multiple complete audio files, different audio files may have different header information, resulting in a failure during the decoding process. In view of the above issue, in some embodiments, a current stream segment is parsed or the current stream segment and stream segments following the current stream segment are parsed, in a case where a failure is occurred in the decoding of the current stream segment of the audio stream based on the header information, until new header information is obtained through the parsing; and the stream segments following the current stream segment are decoded according to the new header information until the audio stream is completely decoded.

For the method of parsing and obtaining the new header information, reference can be made to the method of parsing the header information in the aforementioned embodiment. The new header information is stored, and the header information previously stored can be deleted. Stream segments subsequently received are decoded using the new header information until the audio stream is completed decoded.

In the method of the above embodiment, the one or more stream segments of the data stream are buffered first, and then the one or more stream segments buffered are parsed until the header information is obtained. The header information is stored, and is used to decode stream segments of the audio stream among various stream segments subsequently received until the audio stream is completed decoded. The method of the above embodiment can achieve real-time decoding of an audio stream, meet the demand for real-time decoding of a real-time audio stream in the AI customer service scenario.

In particular, in a scenario where the FFmpeg tool is used to achieve audio decoding, the method in the above embodiment can buffer stream segments in an audio stream buffer, extract and store the header information (comprising the format information and at least one parameter of the audio stream) through parsing; the format information and the at least one parameter of the audio stream can be parsed based on the header information, and a decoder type can be obtained through the format information of the audio stream; stream segments of the audio stream subsequently received can be decoded by a decoder engine linked by the decoder type buffered according to the east one parameter of the audio stream. In this case, an audio stream generated using a standard audio encoder can be decoded in real time, and therefore the problem of unable to decode using the FFmpeg tool because most stream segments do not contain header information can be solved.

During a transmission of the audio stream, if a stream segment transmitted is not segmented according to a length which is an integer multiple of the length of an audio frame, a problem of incomplete audio frames may be present. As shown in FIG. 2, stream segment 1 of the audio stream contains audio frame 1, audio frame 2, and a portion of audio frame 3, while stream segment 2 contains another portion of audio frame 3. In this case, when a decoder is used to decode stream segments 1 and 2 based on the header information, an error will be reported. The present disclosure further provides a solution to the above problem. In some embodiments, a length of an audio frame is determined according to the header information; the stream segments of the audio stream among the various stream segments received are decoded by distinguishing different audio frames according to the length of the audio frame. The length of the audio frame can be determined according to the parameters comprised in the header information. For example, the length of the audio frame can be determined according to parameters such as a sampling rate, a bit depth, a number of channels, and so on. Reference can be made to the prior art for details, which will not be repeated herein.

Figure 3:
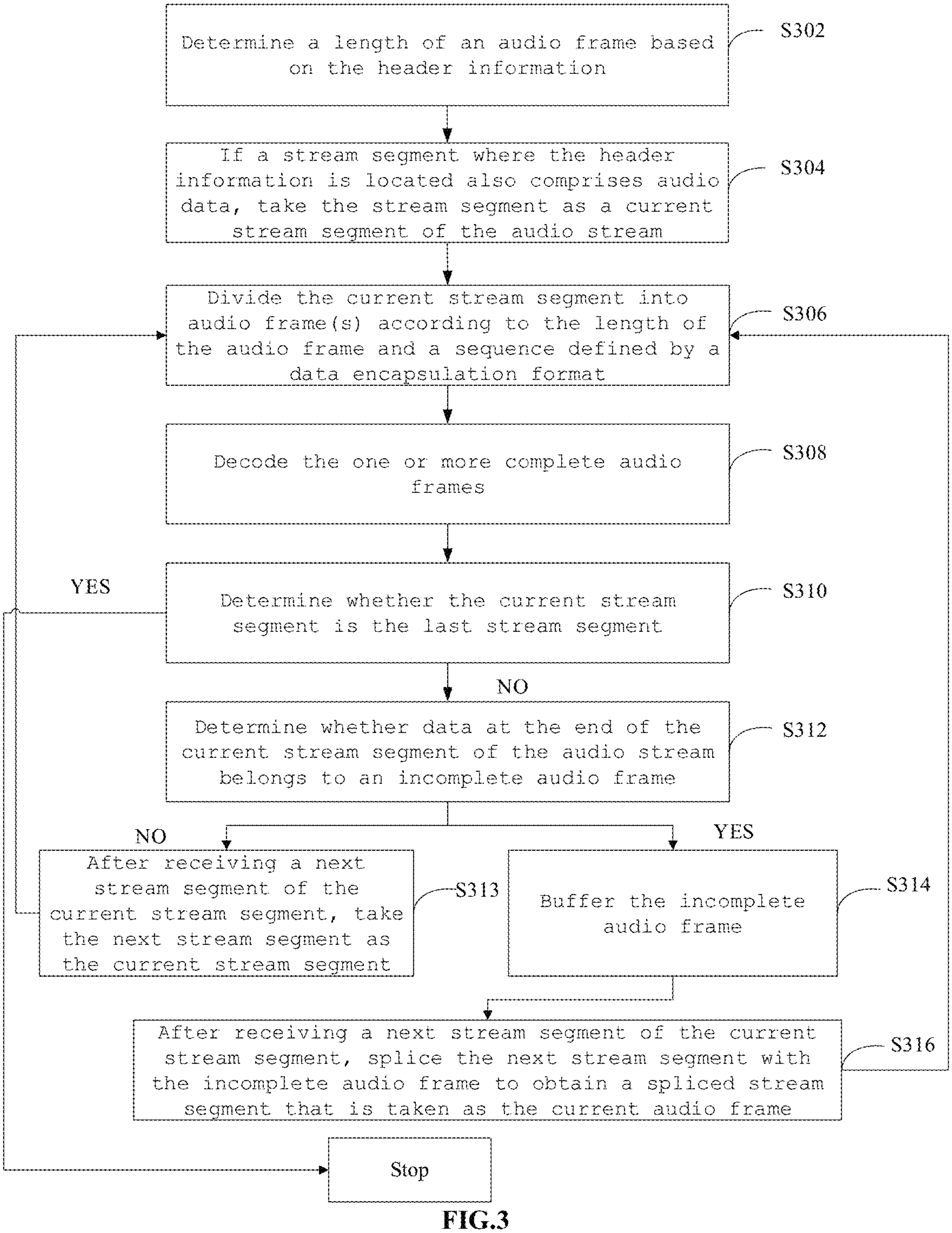
FIG. 3 shows a flowchart of a decoding method according to other embodiments of the present disclosure.

Furthermore, as shown in FIG. 3, the decoding stream segments of the audio stream among various stream segments received according to the header information comprises: steps S302 to S316.

In step S302, a length of an audio frame is determined based on the header information.

In step S304, if a stream segment where the header information is located also comprises audio data, the stream segment is taken as a current stream segment of the audio stream.

In step S306, the current stream segment is divided into audio frame(s) according to the length of the audio frame and a sequence defined by a data encapsulation format. That is, the current stream segment of the audio stream is divided according to a sequence defined by a data encapsulation format and according to the audio frame length to obtain one or more complete audio frames.

For example, data is arranged in a stream segment in a sequence from left to right or from front to back. As shown in FIG. 2, after stream segment 1 is divided into audio frames, data at its end belongs to an incomplete audio frame 3.

In step S308, the one or more complete audio frames are decoded.

In step S310, whether the current stream segment is the last stream segment is determined; if so, the process is stopped, and otherwise, step S312 is executed.

In step S312, whether data at the end of the current stream segment of the audio stream belongs to an incomplete audio frame is determined. If so, step S314 is executed; otherwise, step S313 is executed.

In step S313, after receiving a next stream segment of the current stream segment of the audio stream, the next stream segment is taken as the current stream segment, and the process returns to step S306 to re-execute from step S306.

In step S314, the incomplete audio frame is buffered.

In step S316, after receiving a next stream segment of the current stream segment of the audio stream, the next stream segment is spliced with the incomplete audio frame to obtain a spliced stream segment that is taken as the current audio frame, and the process returns to step S306 to re-execute from step S306.

Figure 2:
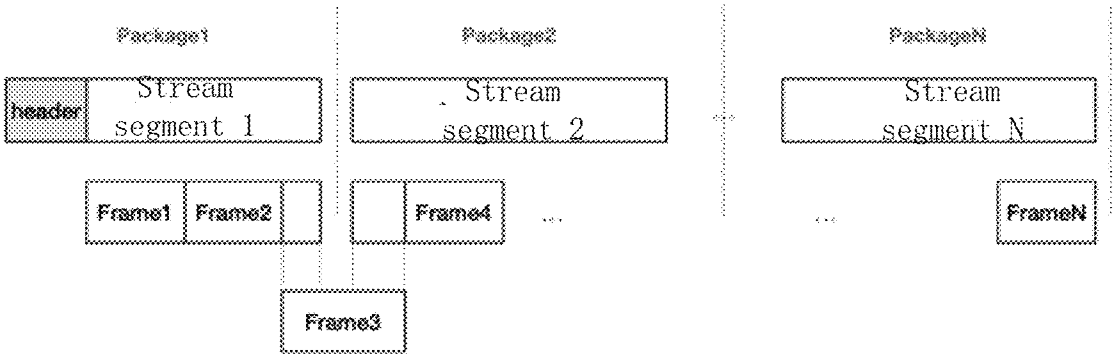
FIG. 2 shows a structural diagram of an audio stream according to some embodiments of the present disclosure.

As shown in FIG. 2, stream segment 2 is spliced with the first half of audio frame 3 contained in stream segment 1 to form a complete frame.

In the method of the above embodiment, an incomplete frame is buffered and a splicing process is performed upon receiving a next stream segment, thereby the problem of incorrect decoding when the stream segment contains an incomplete audio frame can be solved.

The present disclosure further provides a decoding apparatus, which will be described below with reference to FIG. 4.

Figure 4:
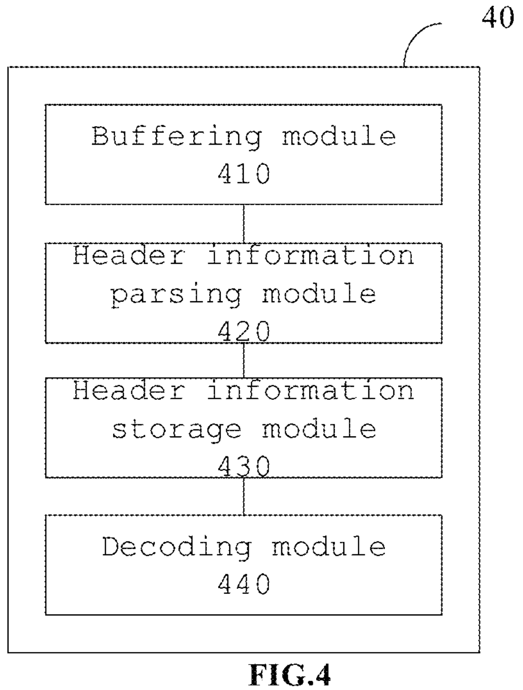
FIG. 4 shows a structural diagram of a decoding apparatus according to some embodiments of the present disclosure.

FIG. 4 is a structural diagram of a decoding apparatus according to some embodiments of the present disclosure. As shown in FIG. 4, the apparatus 40 of this embodiment comprises: a buffering module 410, a header information parsing module 420, a header information storage module 430, and a decoding module 440.

The buffering module 410 is configured to buffer one or more stream segments of a data stream which are received, wherein the data stream comprises an audio stream.

The header information parsing module 420 is configured to parse the one or more stream segments buffered until header information is obtained through the parsing.

In some embodiments, the header information parsing module 420 is configured to determine whether a total data length of all stream segments currently buffered reaches a preset frame length; parse data of the preset frame length from a starting position in the stream segments currently buffered, in a case where the total data length of all the stream segments currently buffered reaches the preset frame length; determine whether the header information is successfully parsed; update the preset frame length by increasing the preset frame length by a preset value, in a case where the header information is not successfully parsed; and repeat the above until the header information is parsed.

In some embodiments, the header information parsing module 420 is configured to, in a case where the total data length of all the stream segments currently buffered does not reach the preset frame length, after receiving and buffering a next stream segment, re-determine whether the total data length of all the stream segments currently buffered reaches the preset frame length.

In some embodiments, the header information parsing module 420 is configured to parse the one or more stream segments buffered by calling an Open avformat method in FFmpeg until the header information is obtained through the parsing.

The header information storage module 430 is configured to store the header information.

The decoding module 440 is configured to decode stream segments of the audio stream among various stream segments received according to the header information until the audio stream is completely decoded.

In some embodiments, the decoding module 440 is configured to determine a length of an audio frame according to the header information; and decode the stream segments of the audio stream among the various stream segments received by distinguishing different audio frames according to the length of the audio frame.

In some embodiments, the decoding module 440 is configured to divide a current stream segment of the audio stream according to a sequence defined by a data encapsulation format and according to the audio frame length to obtain one or more complete audio frames; decode the one or more complete audio frames; determine whether data at an end of the current stream segment of the audio stream belongs to an incomplete audio frame; in a case where the data at the end of the current stream segment of the audio stream belongs to the incomplete audio frame, buffer the incomplete audio frame; after receiving a next stream segment of the current stream segment of the audio frame, splice the next stream segment with the incomplete audio frame to obtain a spliced stream segment; take the spliced stream segment as the current stream segment of the audio stream; and repeat the above until a last stream segment of the audio stream is completely decoded.

In some embodiments, the decoding module 440 is configured to parse a current stream segment or parsing the current stream segment and stream segments following the current stream segment in a case where a failure is occurred in the decoding of the current stream segment of the audio stream based on the header information, until new header information is obtained through the parsing; and decode the stream segments following the current stream segment according to the new header information until the audio stream is completely decoded.

In some embodiments, the decoding module 440 is configured to determine whether the data stream comprises a data stream other than the audio stream according to the header information; in a case where the data stream comprises the data stream other than the audio stream, separate the data stream other than the audio stream from the audio stream; determine format information of the audio stream according to the header information; transcode the stream segments of the audio stream into an original audio stream according to the format information of the audio stream; and re-sample the original audio stream at a preset bit rate.

In some embodiments, the decoding module 440 is configured to separate the data stream other than the audio stream from the audio stream by calling a Separate stream method in FFmpeg; determine the format information of the audio stream according to the header information, transcode the stream segments of the audio stream into an original audio stream according to the format information of the audio stream and re-sample the original audio stream at a preset bit rate, by calling a Parse format method in FFmpeg.

The decoding apparatus of this embodiment of the present disclosure may be implemented by various computing apparatuses or computer systems, which will be described below with reference to FIGS. 5 and 6.

Figure 5:
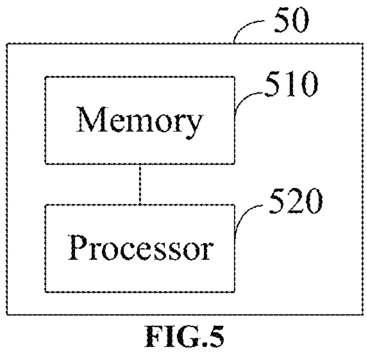
FIG. 5 shows a structural diagram of a decoding apparatus according to other embodiments of the present disclosure.

FIG. 5 is a structural diagram of a decoding apparatus according to some embodiments of the present disclosure. As shown in FIG. 5, the apparatus 50 of this embodiment comprises: a memory 510 and a processor 520 coupled to the memory 510, the processor 520 configured to, based on instructions stored in the memory 510, carry out the decoding method according to any one of the embodiments of the present disclosure.

Wherein, the memory 510 may comprise, for example, system memory, a fixed non-volatile storage medium, or the like. The system memory stores, for example, an operating system, applications, a boot loader, a database, and other programs.

Figure 6:
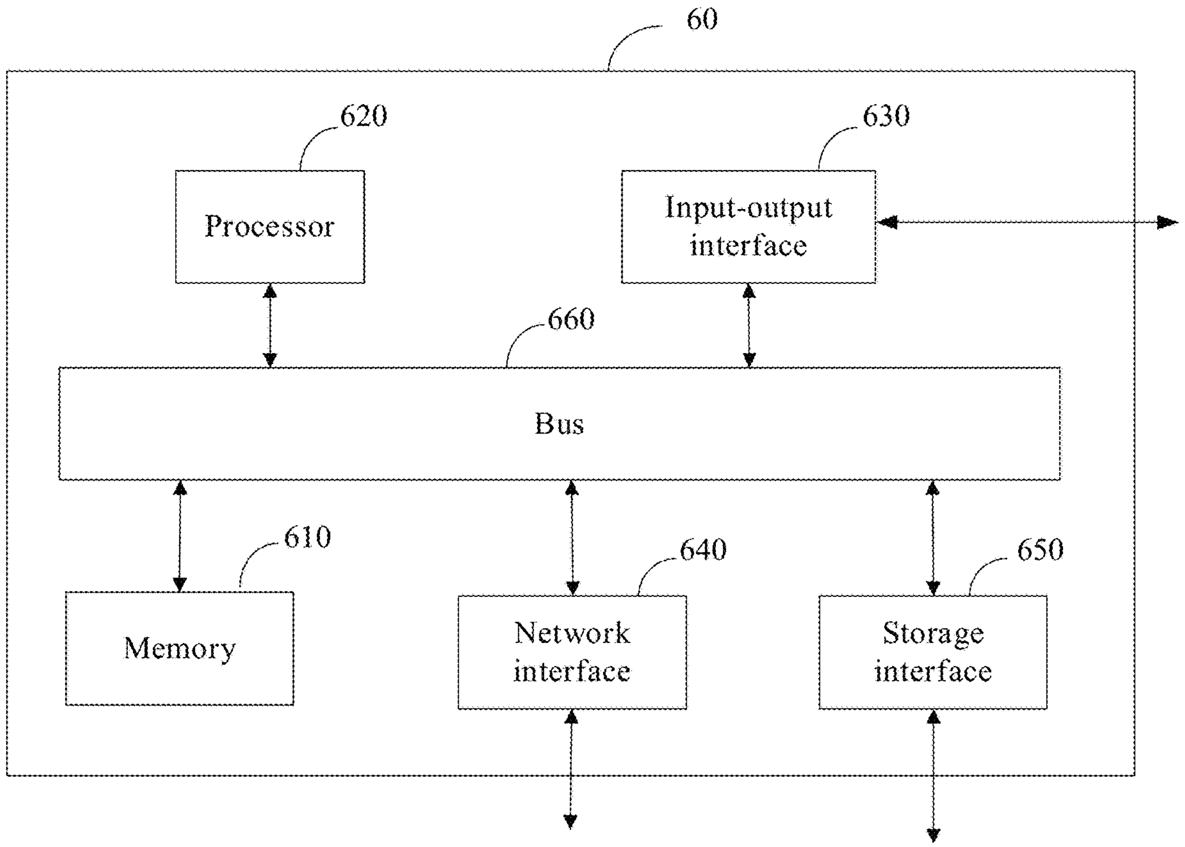
FIG. 6 shows a structural diagram of a decoding apparatus according to still other embodiments of the present disclosure.

FIG. 6 is a structural diagram of a decoding apparatus according to other embodiments of the present disclosure. As shown in FIG. 6, the apparatus 60 of this embodiment comprises: a memory 610 and a processor 620 that are similar to the memory 510 and the processor 520, respectively. It may further comprise an input-output interface 630, a network interface 640, a storage interface 650, and the like. These interfaces 630, 640, 650, the memory 610 and the processor 620 may be connected through a bus 660, for example. Wherein, the input-output interface 630 provides a connection interface for input-output apparatuses such as a display, a mouse, a keyboard, and a touch screen. The network interface 640 provides a connection interface for various networked apparatuses, for example, it can be connected to a database server or a cloud storage server. The storage interface 650 provides a connection interface for external storage apparatuses such as an SD card and a USB flash disk.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage apparatus, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable storage apparatus capable of directing a computer or other programmable data processing apparatus to operate in a specific manner such that the instructions stored in the computer readable storage apparatus produce an article of manufacture comprising instruction means implementing the functions specified in one or more flows of the flowcharts and/or one or more blocks of the block diagrams.

These computer program instructions can also be loaded onto a computer or other programmable apparatus to perform a series of operation steps on the computer or other programmable apparatus to generate a computer-implemented process such that the instructions executed on the computer or other programmable apparatus provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A decoding method, comprising:

buffering one or more stream segments of a data stream which are received, wherein the data stream comprises an audio stream;

parsing the one or more stream segments buffered until header information is obtained through the parsing, comprising: determining whether a total data length of all stream segments currently buffered reaches a preset frame length, parsing data of the preset frame length from a starting position in the stream segments currently buffered, in a case where the total data length of all the stream segments currently buffered reaches the preset frame length, determining whether the header information is successfully parsed, updating the preset frame length by increasing the preset frame length by a preset value, in a case where the header information is not successfully parsed, and repeating the above until the header information is parsed, wherein not every stream segment contains the header information;

storing the header information; and decoding stream segments of the audio stream among various stream segments received according to the header information until the audio stream is completely decoded.

2. The decoding method according to claim 1, wherein the parsing the one or more stream segments buffered until header information is obtained through the parsing further comprises:

in a case where the total data length of all the stream segments currently buffered does not reach the preset frame length, after receiving and buffering a next stream segment, re-determining whether the total data length of all the stream segments currently buffered reaches the preset frame length.

3. The decoding method according to claim 1, wherein the decoding stream segments of the audio stream among various stream segments received according to the header information comprises:

determining a length of an audio frame according to the header information; and decoding the stream segments of the audio stream among the various stream segments received by distinguishing different audio frames according to the length of the audio frame.

4. The decoding method according to claim 3, wherein the decoding the stream segments of the audio stream among various stream segments received by distinguishing different audio frames according to the length of the audio frame comprises:

dividing a current stream segment of the audio stream according to a sequence defined by a data encapsulation format and according to the audio frame length to obtain one or more complete audio frames;

decoding the one or more complete audio frames;

determining whether data at an end of the current stream segment of the audio stream belongs to an incomplete audio frame;

in a case where the data at the end of the current stream segment of the audio stream belongs to the incomplete audio frame, buffering the incomplete audio frame;

after receiving a next stream segment of the current stream segment of the audio frame, splicing the next stream segment with the incomplete audio frame to obtain a spliced stream segment;

taking the spliced stream segment as the current stream segment of the audio stream; and repeating the above until a last stream segment of the audio stream is completely decoded.

5. The decoding method according to claim 1, wherein the decoding stream segments of the audio stream among various stream segments received according to the header information until the audio stream is completely decoded comprises:

parsing a current stream segment or parsing the current stream segment and stream segments following the current stream segment in a case where a failure is occurred in the decoding of the current stream segment of the audio stream based on the header information, until new header information is obtained through the parsing; and decoding the stream segments following the current stream segment according to the new header information until the audio stream is completely decoded.

6. The decoding method according to claim 1, wherein the parsing the one or more stream segments buffered until header information is obtained through the parsing comprises:

parsing the one or more stream segments buffered by calling an Open avformat method in FFmpeg until the header information is obtained through the parsing.

7. The decoding method according to claim 1, wherein the decoding stream segments of the audio stream among various stream segments received according to the header information comprises:

determining whether the data stream comprises a data stream other than the audio stream according to the header information;

in a case where the data stream comprises the data stream other than the audio stream, separating the data stream other than the audio stream from the audio stream;

determining format information of the audio stream according to the header information;

transcoding the stream segments of the audio stream into an original audio stream according to the format information of the audio stream; and re-sampling the original audio stream at a preset bit rate.

8. The decoding method according to claim 7, wherein:

the data stream other than the audio stream is separated from the audio stream by calling a Separate stream method in FFmpeg;

the format information of the audio stream is determined according to the header information, the stream segments of the audio stream are transcoded into the original audio stream according to the format information of the audio stream, and the original audio stream is re-sampled at the preset bit rate, by calling a Parse format method in FFmpeg.

9. A decoding apparatus, comprising:

a processor; and a memory coupled to the processor for storing instructions, which when executed by the processor, cause the processor to:

buffer one or more stream segments of a data stream which are received, wherein the data stream comprises an audio stream;

parse the one or more stream segments buffered until header information is obtained through the parsing, comprising: determining whether a total data length of all stream segments currently buffered reaches a preset frame length, parsing data of the preset frame length from a starting position in the stream segments currently buffered, in a case where the total data length of all the stream segments currently buffered reaches the preset frame length, determining whether the header information is successfully parsed, updating the preset frame length by increasing the preset frame length by a preset value, in a case where the header information is not successfully parsed, and repeating the above until the header information is parsed, wherein not every stream segment contains the header information;

store the header information; and decode stream segments of the audio stream among various stream segments received according to the header information until the audio stream is completely decoded.

10. A non-transitory computer-readable storage medium having a computer program stored thereon, wherein the program when executed by a processor, cause the processer to:

buffer one or more stream segments of a data stream which are received, wherein the data stream comprises an audio stream;

parse the one or more stream segments buffered until header information is obtained through the parsing, comprising: determining whether a total data length of all stream segments currently buffered reaches a preset frame length, parsing data of the preset frame length from a starting position in the stream segments currently buffered, in a case where the total data length of all the stream segments currently buffered reaches the preset frame length, determining whether the header information is successfully parsed, updating the preset frame length by increasing the preset frame length by a preset value, in a case where the header information is not successfully parsed, and repeating the above until the header information is parsed, wherein not every stream segment contains the header information;

store the header information; and decode stream segments of the audio stream among various stream segments received according to the header information until the audio stream is completely decoded.

11. The decoding apparatus according to claim 9, wherein the parsing the one or more stream segments buffered until header information is obtained through the parsing further comprises:

in a case where the total data length of all the stream segments currently buffered does not reach the preset frame length, after receiving and buffering a next stream segment, re-determining whether the total data length of all the stream segments currently buffered reaches the preset frame length.

12. The decoding apparatus according to claim 9, wherein the decoding stream segments of the audio stream among various stream segments received according to the header information comprises:

determining a length of an audio frame according to the header information; and decoding the stream segments of the audio stream among the various stream segments received by distinguishing different audio frames according to the length of the audio frame.

13. The decoding apparatus according to claim 12, wherein the decoding the stream segments of the audio stream among various stream segments received by distinguishing different audio frames according to the length of the audio frame comprises:

dividing a current stream segment of the audio stream according to a sequence defined by a data encapsulation format and according to the audio frame length to obtain one or more complete audio frames;

decoding the one or more complete audio frames;

determining whether data at an end of the current stream segment of the audio stream belongs to an incomplete audio frame;

in a case where the data at the end of the current stream segment of the audio stream belongs to the incomplete audio frame, buffering the incomplete audio frame;

after receiving a next stream segment of the current stream segment of the audio stream, splicing the next stream segment with the incomplete audio frame to obtain a spliced stream segment;

taking the spliced stream segment as the current stream segment of the audio stream; and repeating the above until a last stream segment of the audio stream is completely decoded.

14. The decoding apparatus according to claim 9, wherein the decoding stream segments of the audio stream among various stream segments received according to the header information until the audio stream is completely decoded comprises:

parsing a current stream segment or parsing the current stream segment and stream segments following the current stream segment in a case where a failure is occurred in the decoding of the current stream segment of the audio stream based on the header information, until new header information is obtained through the parsing; and decoding the stream segments following the current stream segment according to the new header information until the audio stream is completely decoded.

15. The decoding apparatus according to claim 9, wherein the decoding stream segments of the audio stream among various stream segments received according to the header information comprises:

determining whether the data stream comprises a data stream other than the audio stream according to the header information;

in a case where the data stream comprises the data stream other than the audio stream, separating the data stream other than the audio stream from the audio stream;

determining format information of the audio stream according to the header information;

transcoding the stream segments of the audio stream into an original audio stream according to the format information of the audio stream; and re-sampling the original audio stream at a preset bit rate.

16. The non-transitory computer-readable storage medium according to claim 10, wherein the parsing the one or more stream segments buffered until header information is obtained through the parsing further comprises:

in a case where the total data length of all the stream segments currently buffered does not reach the preset frame length, after receiving and buffering a next stream segment, re-determining whether the total data length of all the stream segments currently buffered reaches the preset frame length.

17. The non-transitory computer-readable storage medium according to claim 10, the decoding stream segments of the audio stream among various stream segments received according to the header information comprises:

determining a length of an audio frame according to the header information; and decoding the stream segments of the audio stream among the various stream segments received by distinguishing different audio frames according to the length of the audio frame.

18. The non-transitory computer-readable storage medium according to claim 17, wherein the decoding the stream segments of the audio stream among various stream segments received by distinguishing different audio frames according to the length of the audio frame comprises:

dividing a current stream segment of the audio stream according to a sequence defined by a data encapsulation format and according to the audio frame length to obtain one or more complete audio frames;

decoding the one or more complete audio frames;

determining whether data at an end of the current stream segment of the audio stream belongs to an incomplete audio frame;

in a case where the data at the end of the current stream segment of the audio stream belongs to the incomplete audio frame, buffering the incomplete audio frame;

after receiving a next stream segment of the current stream segment of the audio frame, splicing the next stream segment with the incomplete audio frame to obtain a spliced stream segment;

taking the spliced stream segment as the current stream segment of the audio stream; and repeating the above until a last stream segment of the audio stream is completely decoded.

19. The non-transitory computer-readable storage medium according to claim 10, wherein the decoding stream segments of the audio stream among various stream segments received according to the header information until the audio stream is completely decoded comprises:

parsing a current stream segment or parsing the current stream segment and stream segments following the current stream segment in a case where a failure is occurred in the decoding of the current stream segment of the audio stream based on the header information, until new header information is obtained through the parsing; and decoding the stream segments following the current stream segment according to the new header information until the audio stream is completely decoded.

20. The non-transitory computer-readable storage medium according to claim 10, wherein the parsing the one or more stream segments buffered until header information is obtained through the parsing comprises:

parsing the one or more stream segments buffered by calling an Open avformat method in FFmpeg until the header information is obtained through the parsing.

* * * * *